US009151833B2

(12) United States Patent
Skjold-Larsen

(10) Patent No.: US 9,151,833 B2
(45) Date of Patent: Oct. 6, 2015

(54) METHOD FOR DETERMINING DISTANCE BETWEEN UNDERWATER ACOUSTIC DEVICES

(75) Inventor: Henning Skjold-Larsen, Åsgårdstrand (NO)

(73) Assignee: Scantrawl AS, Algardstrand (NO)

( * ) Notice: Subject to any disclaimer, the term of this patent is extended or adjusted under 35 U.S.C. 154(b) by 32 days.

(21) Appl. No.: 14/346,325

(22) PCT Filed: Sep. 11, 2012

(86) PCT No.: PCT/EP2012/067724
§ 371 (c)(1),
(2), (4) Date: Jul. 1, 2014

(87) PCT Pub. No.: WO2013/041408
PCT Pub. Date: Mar. 28, 2013

(65) Prior Publication Data
US 2014/0301166 A1    Oct. 9, 2014

(30) Foreign Application Priority Data

Sep. 22, 2011  (NO) .................................. 20111288

(51) Int. Cl.
| | |
|---|---|
| *G01S 11/00* | (2006.01) |
| *G01S 11/14* | (2006.01) |
| *G01S 5/30* | (2006.01) |
| *A01K 73/04* | (2006.01) |
| *A01K 73/02* | (2006.01) |
| *A01K 73/045* | (2006.01) |
| *A01K 73/05* | (2006.01) |
| *G01V 1/38* | (2006.01) |

(52) U.S. Cl.
CPC ............... *G01S 11/14* (2013.01); *A01K 73/02* (2013.01); *A01K 73/04* (2013.01); *A01K 73/045* (2013.01); *A01K 73/05* (2013.01); *G01S 5/30* (2013.01); *G01V 1/3835* (2013.01)

(58) Field of Classification Search
CPC ....... G01S 11/14; A01K 74/04; G01V 1/3835
See application file for complete search history.

(56) References Cited

U.S. PATENT DOCUMENTS

| | | | | |
|---|---|---|---|---|
| 3,860,900 A | * | 1/1975 | Scudder | 367/6 |
| 4,070,671 A | * | 1/1978 | Morrow | 367/6 |
| 4,086,560 A | * | 4/1978 | Johnston et al. | 367/100 |
| 4,229,809 A | * | 10/1980 | Schwalbe | 367/6 |
| 4,555,779 A | * | 11/1985 | Roberts | 367/19 |
| 4,924,446 A | * | 5/1990 | Cyr | 367/6 |
| 5,214,617 A | * | 5/1993 | Rouquette | 367/124 |

(Continued)

FOREIGN PATENT DOCUMENTS

| | | |
|---|---|---|
| GB | 2089042 A | 6/1982 |
| NO | 331380 Y | 8/2010 |
| WO | WO2010/090526 A | 8/2010 |

*Primary Examiner* — Isam Alsomiri
*Assistant Examiner* — Hovhannes Baghdasaryan
(74) *Attorney, Agent, or Firm* — Christian Abel

(57) ABSTRACT

The invention consists of a method which comprises a plurality of steps for determining difference in distance from a reference point to at least two sensor modules 10, 20 that are located under water. The sensor modules 10, 20 comprise means for sending and receiving acoustic signals to each other and to a hydrophone 30 at the reference point. Connected to the hydrophone 30 is a calculating unit 40 that utilises arrival time of the received signals from the sensor modules to determine difference in distance from the sensor modules 10, 20 to the reference point.

14 Claims, 4 Drawing Sheets

(56) References Cited

U.S. PATENT DOCUMENTS

| | | | |
|---|---|---|---|
| 5,615,175 A * | 3/1997 | Carter et al. ............. 367/124 |
| 5,691,957 A * | 11/1997 | Spiesberger ............. 367/3 |
| 5,696,733 A | 12/1997 | Zinn et al. |
| 6,366,533 B1 * | 4/2002 | English ............. 367/131 |
| 7,062,381 B1 * | 6/2006 | Rekow et al. ............. 701/300 |
| 7,366,056 B2 * | 4/2008 | Frivik et al. ............. 367/129 |
| 2005/0180263 A1 * | 8/2005 | Lambert et al. ............. 367/128 |
| 2006/0083110 A1 * | 4/2006 | Tietjen ............. 367/127 |
| 2007/0089349 A1 * | 4/2007 | Skjold-Larsen ............. 43/9.1 |
| 2007/0091719 A1 | 4/2007 | Falkenberg |
| 2007/0159923 A1 * | 7/2007 | Huff ............. 367/118 |
| 2008/0192575 A1 * | 8/2008 | Coleman ............. 367/115 |
| 2008/0304358 A1 * | 12/2008 | Mellier et al. ............. 367/19 |

* cited by examiner

METHOD FOR DETERMINING DISTANCE BETWEEN UNDERWATER ACOUSTIC DEVICES

INTRODUCTION

The present invention comprises a method for determining distance from a reference point to at least two sensor modules, all of which are located under water.

BACKGROUND OF THE INVENTION

Measurement of distances between sensor modules under water and a reference point, which, for example, is a vessel towing the sensor modules behind it, has been a well-known problem area which up to now has been solved by measuring the length of the line or wire between vessel and sensor modules. An alternative may be to send an acoustic signal from a reference point to a sensor module, and then measure the time it takes to receive a responding signal from the sensor module. This measuring alone will however make an uncertain measurement.

Accurate measurement of the line length has been found to be difficult in practice since the line may stretch, curve or twist. This is the case whether the length of line is measured manually as it leaves the vessel, or whether the number of rotations a winch has made in paying out and adjusting a certain length of line is measured. Furthermore, the last-mentioned is dependent on how the line is coiled, which may be different from one time to another. The problem is exacerbated when the distance between the sensor modules and the vessel becomes large, i.e., several hundred metres. A line or wire will then be able stretch quite considerably and become longer than when it is coiled up Today there are different devices for measuring distances under water using a measuring principle comprising transmission and reception of sound waves. This comprises primarily the use of sonar or echo sounders.

The principle of these devices is to emit a sound wave and measure the time it takes before the same sound wave is reflected. To find the distance from, for example, a vessel to one or more sensor modules, the sonar principle can be used by emitting a sound wave from the vessel and receiving reflections or transmitted signals from sensor modules towed behind the vessel. The time the sound waves take to pass to or from the sensor modules will then be proportional to the distance between them and the vessel. The last-mentioned principle is also used to find the distance between two or more sensor modules under water.

WO-2010/090526 A1 describes a method for determining difference in distance from a reference point to at least two sensor modules where the reference point and the sensor modules are under water. The sensor modules comprises means for sending and receiving acoustic signals and the reference point comprises a hydrophone for receiving acoustic signals from the sensor modules. Said method describes the difference in distance and not the distance itself.

U.S. Pat. No. 5,214,617A shows an example of a standard technique and describes a system and a method for determining the distance between individual hydro acoustic transceivers placed on objects under water. The system uses synchronization of clocks in sensor modules comprised in the system.

It is desirable with a more accurate distance determination where several measured parameters are coordinated for determining distance.

Calculation of distance from one point to another can be performed in two ways. The first is to measure travel time of a signal by using clocks suck that the receiver of the sent signal knows when it was sent. It is the only necessary to send the signal only one way, e.g. from a sensor module to a reference point having a hydrophone for picking up the signals.

The other known method is to send a signal from one sensor to another and measure the time before the signal is returned.

By sending signals from two or more sensor modules with a known time difference, the signals that are received by a hydrophone will indicate difference in distance between the sensor modules. This may be useful information per se if, for example, it is desirable that two or more sensor modules at all times should have a constant difference in distance or the same distance to, for example, a vessel towing them behind it.

A well-known problem when using sound waves under water is furthermore that the sound propagation velocity is dependent on a number of factors such as water temperature, salt content, pressure, etc. These will vary according to location, season, current conditions etc. It is the water temperature that has the greatest impact for the measuring result.

Several suppliers of sensor modules for use under water use a fixed velocity of 1500 m/s for propagation of sound waves, or the velocity of sound in water "is set" manually by look up relevant values for the sound velocity in water at a given temperature.

Water temperature in the vertical direction changes with depth. Warm water rises and cold water sinks down. In addition, the sun will warm the surface water.

The water temperature in the horizontal direction may also vary depending on distances and where measurements are made. For example, water close to the shore will have a higher temperature than water that is further from the shore.

There are some devices which have a temperature sensor incorporated for measuring the temperature locally in the water where the device is located. The disadvantage of such systems is that a water temperature measured locally at the location of, for example, an echo sounder may be very different from the water temperature along the whole propagation path of the sound wave. This will be the case, in particular, across large distances. The sound velocity that is then used in calculations of distances under water will be incorrect and result in large deviations in calculated distance in relation to the real distance.

The present invention solves the last-mentioned problem by measuring temperatures at at least one or more points along the path the sound will propagate so as to collate them for a more accurate calculation of distances under water. This is done by transferring real measured temperature or calculated sound velocity from measured temperature to a unit connected to a hydrophone at the reference point for calculating distance under water. Greater accuracies will thus be obtained by a measurement of this kind.

Combining received signals regarding time of arrival and time of flight the emission of sound waves from at least two sensor modules and simultaneously adjusting the sound velocity in relation to measured water temperature will allow difference in distance to the sensor modules to be found with greater accuracy. This may, for example, be used for precise adjustment and positioning of a trawl.

SUMMARY OF THE INVENTION

The object of the present invention is to provide a method for determining distance from a reference point to at least two sensor modules, all of which are located under water, wherein the sensor modules are in signal connection with each other in that they comprise means for sending and receiving acoustic signals, and wherein the reference point comprises a hydrophone for receiving acoustic signals from the sensor modules, said method being characterised by comprising the following steps:

sending an acoustic signal from the first sensor module to the second sensor module;

sending an acoustic signal from the second sensor module to the first sensor module and the hydrophone either immediately, or following set time delays after the second sensor module receives the said first acoustic signal sent from the first sensor module;

measuring in the first sensor module the time $T_1$ it takes from when the acoustic signal is sent from the first sensor module until the first sensor module receives the said acoustic signal sent from the second sensor module;

sending an acoustic signal, comprising the said time $T_1$, from the first sensor module to the hydrophone either immediately, or following a set time delay after the first sensor module receives the said acoustic signal sent from the second sensor module;

measuring arrival times and travel times of received acoustic signals sent from the first and second sensor module to the hydrophone at the reference point;

determining the difference in distance from the reference point to each of the sensor modules by calculating this difference in a calculating unit connected to the hydrophone at the reference point based on measured arrival times of acoustic signals on the hydrophone, and on the time $T_1$ and optional set time delays, characterised in performing the following additional steps:

adjusting and positioning the distance to the sensor modules in relation to the reference point such that calculated difference in distance approaches zero;

logging over time values of received acoustic signals within a set uncertainty for calculated differences for distances approaching zero;

determining distance from the reference point to the at least two sensor modules by using measured travel times of the acoustic signals that are included in said logged values.

Further features of the inventive method are defined in the dependent claims of the set of claims.

DETAILED DESCRIPTION

The present invention presents a method for calculating distance from a reference point to at least two sensor modules, all of which are located under water. The solution is advantageous for the performance of various types of operations that take place under water, for example, in fisheries and the offshore industry. The invention will be of importance for operation of equipment, towing of fishing gear, seismic shooting etc. Other areas where the invention may advantageously be used are in the installation of, e.g., pipelines and subsea cables.

The invention will now be described in more detail with reference to the attached figures, wherein.

The invention is defined by a method for determining distance from a reference point to at least two sensor modules 10, 20 when these have the same distance to the reference point and all of which are located under water, wherein the sensor modules 10, 20 are in signal connection with each other in that they comprise means for sending and receiving acoustic signals, and wherein the reference point comprises a hydrophone 30 with means for receiving acoustic signals from the sensor modules 10, 20, said method being characterised in that it comprises several steps that are carried out.

Figure 1:
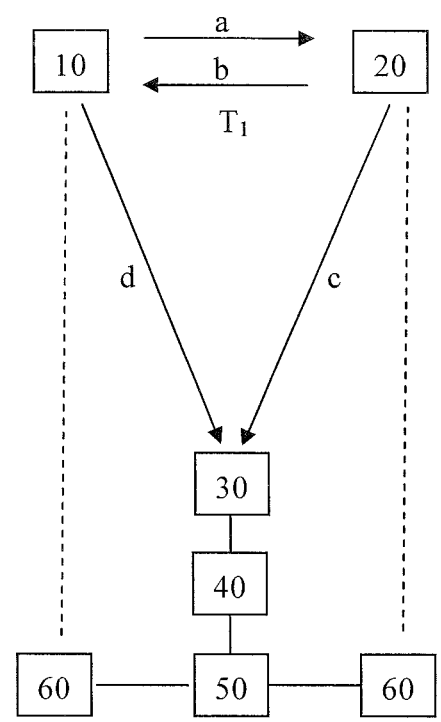
FIG. 1 illustrates how a calculating unit connected to a hydrophone can calculate the difference in distance between two sensor modules.

FIG. 1 indicates with arrows a) to d) the sequence and direction of acoustic signals which are sent between sensor modules 10 and 20 and a hydrophone 30. This allows a calculating unit 40 connected to the hydrophone 30 to calculate difference in distance to the sensor modules 10 and 20.

The first step in the inventive method is to send a first acoustic signal a) from the first sensor module 10 to the second sensor module 20.

The second step is to send an acoustic signal b) from the second sensor module 20 to the first sensor module 10 and the hydrophone 30, either immediately or following set time delays after the second sensor module 20 receives the said first acoustic signal a) sent from the first sensor module 10. A fixed time delay will in that case be known in advance to the first sensor module 10.

The third step is to measure in the first sensor module 10 the time $T_1$ it takes from when the acoustic signal a) is sent from the first sensor module 10 until the first sensor module 10 receives the said acoustic signal b) sent from the second sensor module 20. This measurement is made by measuring the time a signal a) takes from when it is sent from the first sensor module 10 until it receives a signal b) from the second sensor module 20, and subtracting an optional known time difference of emitted acoustic signal b) in the second sensor module 20 and dividing the remaining time measured by two.

The fourth step is to send an acoustic signal d) comprising the said time $T_1$ from the first sensor module 10 to the hydrophone 30 either immediately, or following a set time delay after the first sensor module 10 receives the said acoustic signal sent from the second sensor module 20.

Arrival times of received acoustic signals on the hydrophone 30 at the reference point are then measured. If one of the sensor modules 10, 20 has a longer distance to the vessel than the other, the signal received on the hydrophone 30 there from will take longer than the signal from the other. This will result in a time difference between the emitted acoustic signals from the sensor modules 10, 20.

Travel times between the hydrophone 30 and the sensor modules 10, 20 are used for calculating the distance from one point to another, and can be done in two ways. One way is to measure the travel time of a signal by use of clocks at the hydrophone 30 and sensor modules 10, 20, such that signal computing means at the receiver knows when a received signal was sent.

The other way to measure travel time of a signal is to send a signal from a location at the hydrophone 30 to a sensor module and measure the time before a signal is returned.

The next step in the method is to determine the difference in distance from the reference point to each of the sensor modules 10, 20 by calculating this difference in a calculating unit 40 connected to the hydrophone 30 at the reference point based on measured arrival times of acoustic signals sent from the first and second sensor module 10, 20 to the hydrophone 30, and the time $T_1$ and optional set time delays.

This information can then be used to adjust and position the sensor modules 10, 20 such that the calculated difference in distance between hydrophone 30 and the sensor modules 10, 20 approaches zero.

Values of received acoustic signals within a set uncertainty for calculated differences for distances approaching zero are then logged over time. All values not within one standard deviation can for instance be discarded.

The distance from a reference point to the at least two sensor modules 10, 20 is determined by using measured travel times to the acoustic signals that are comprised in the logged values.

An object of the present invention is primarily to determine difference in distance from the reference point to each of the sensor modules 10, 20 as precisely as possible.

Another object is to adjust and position the sensor modules 10, 20 in relation to the said reference point such that the distance between the reference point and each of the sensor modules 10 and 20 are equally long, i.e. that the difference in distance approaches zero.

The last-mentioned is visualised best in that the sensor modules 10, 20 are connected to devices the position of which it is desired to control and change.

In one embodiment the reference point may be connected to a vessel, and the sensor modules 10, 20 move in relation to the vessel.

In another embodiment the reference point may be connected to a fixed structure, and the sensor modules 10, 20 move in relation to the fixed structure.

The adjustment and positioning of the sensor modules 10, 20 as regards difference in distance between a reference point and each of the sensor modules 10, 20 can be carried out in that calculated differences in distances are sent to controller 50 which controls a control unit 60 that adjusts and positions the sensor modules 10, 20.

The last-mentioned can be done in that the sensor modules 10, 20 are towed behind, for example, a vessel via a line or wire that is fastened to trawl winches which control them in that the trawl winches are connected to said control unit 60.

Adjustment and positioning of sensor modules 10, 20 which are not necessarily attached to a trawl can be effected in that control signals are sent from the control unit 60 to sensor modules 10, 20 which travel behind the vessel with the aid of separate remote-controlled propulsion means.

The said reference point need not be a hydrophone on a vessel, but it may, for example, be connected to a fixed structure such as an offshore structure, the sensor modules 10, 20 moving in relation to the fixed structure. The inventive method will then be able to determine difference in distance, and optionally adjust and position the sensor modules 10, 20 in relation to the fixed structure based on calculated difference in distance.

Figure 2:
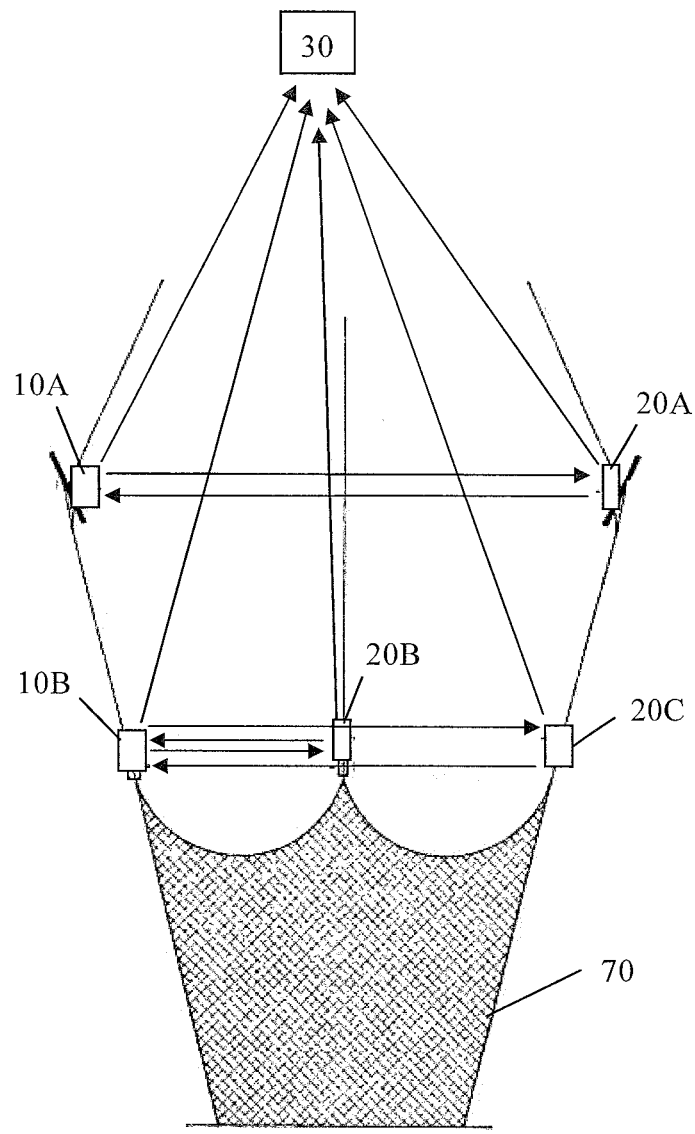
FIG. 2 shows a system for practical application of sensor modules for optimising a trawl operation.

FIG. 2 shows a system for practical application of sensor modules for optimising a trawl operation. In such a set-up, pairs of sensor modules 10A, 20A, 10B, 20C and 10B, 20B function as symmetry sensors that can be used to detect whether the opening of a trawl 70 is towed symmetrically behind a vessel or with desired and optimal symmetry. If this is not the case, the position and the opening of the trawl 70 can be adjusted and positioned such that desired symmetry is obtained.

In that the sensor modules 10A, 10B, 20A, 20B, 20C are attached at different points in connection with the trawl 70, it will be possible, through use of the inventive method, to detect difference in arrival time of signals on a hydrophone 30 on a vessel and calculate difference in distance from the vessel to the different sensor modules 10A, 10B, 20A, 20B, 20C and thus determining whether the trawl 70 is towed with desired symmetry. This information may then be used to control trawl winches either manually or automatically. The last-mentioned form of control is effected in that the controller 50 on the vessel controls winches 60 which adjust the lines to which the sensor modules 10A, 10B, 20A, 20B, 20C are attached. By using a plurality of sensor modules 10A, 10B, 20A, 20B, 20C which work together as pairs, as is shown in FIG. 2, further information may be supplied to the calculating unit 50, and more lines connected to the trawl can be adjusted.

Figure 3:
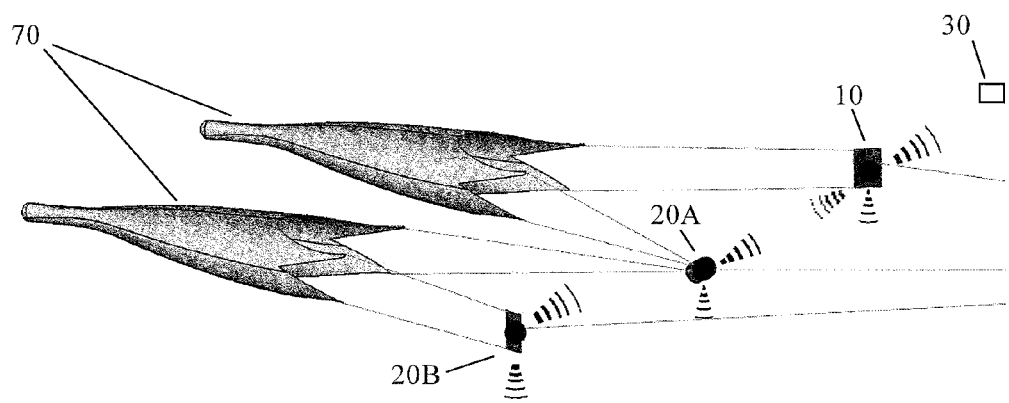
FIG. 3 shows sensor modules mounted in connection with a trawl.

FIG. 3 is a lateral section showing sensor modules 10A, 20A, 20B mounted in connection with trawl 70. The sensor modules 10A, 20A, 20B may be equipped with depth pressure cells and acoustic height indicators. The transfer of signals between the sensor modules will be similar to that mentioned above. The additional information of depth and height will be useful additional information in determining the difference is distance between the sensor modules 10A, 20A, 20B.

Figure 4:
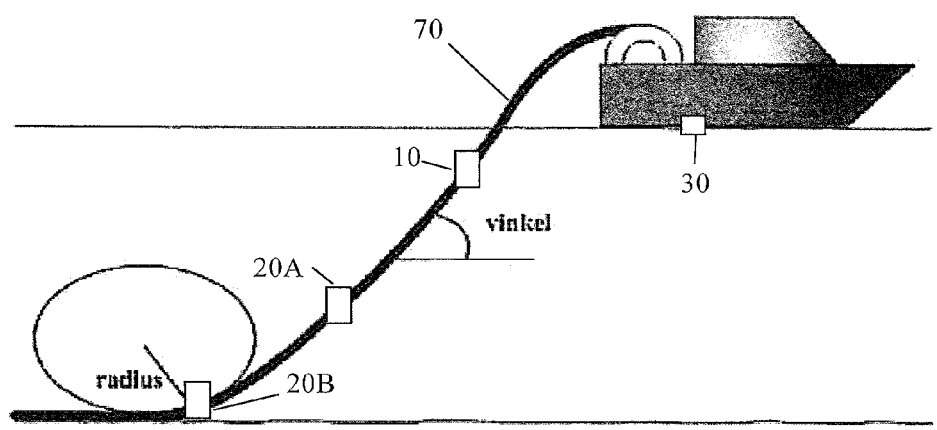
FIG. 4 shows sensor modules mounted on seismic cables.

FIG. 4 shows another example of the use of the inventive method by employing two or more sensor modules 10A, 20B, 20C attached to a seismic cable at differently spaced locations on the cable. The inventive method makes it possible to determine differences in distance from the sensor modules to a hydrophone 30 at a reference point, e.g., a vessel, such that the profile that the seismic cable has at any given time can be determined when the properties of the cable such as cross-section, rigidity etc. are known. As a streamer cable can be several kilometres in length, it may be favourable to correct for different speed profiles in the water.

FIGS. 2 to 4 show by way of example embodiments of the use of the method according to the invention. Embodiments are also conceivable where the calculating unit 40 receives position data from a GPS on a vessel that indicates the vessel's position, heading and speed. This will be useful additional information for adjusting and positioning the sensor modules 10, 20.

If the vessel also comprises acoustic means for sending signals to the sensor modules 10, 20 which, upon receiving these signals, send acoustic signals back to the hydrophone 30 on the vessel, the actual distance between the sensor modules 10, 20 and the hydrophone 30 will be determined, and not only the difference in distance between the sensor modules 10, 20 and the hydrophone 30. An alternative is to let the sensor modules 10, 20 and the hydrophone be equipped with clocks. In this case is it as mentioned earlier only necessary with one way communication from the sensor modules 10, 20 to the hydrophone 30.

Combining the information about distance between the sensor modules 10, 20 and the hydrophone 30 with the information about the vessel's position, heading and speed will allow the precise position of the sensor modules to be determined.

This will be important information when trawling in critical areas containing installations such as pipelines etc. In such places a precise positioning and handling of the trawl will be necessary to avoid damaging the trawl or equipment.

For further information about the position of the sensor modules 10, 20, their depth and height can, as mentioned, be measured using pressure sensors and height indicator. This information can be sent to the hydrophone 30 on the vessel in order to provide a precise three-dimensional (x, y, z) position of the sensor modules 10, 20 which in turn provides a better means of optimising and adjusting the position of the sensor modules 10, 20 and thus the equipment to which they are attached.

The present invention utilises measurement of the time that elapses from transmission to reception of sound under water. As previously mentioned, it is a well-known problem that measurements using sound waves under water can give uncertain measurements depending on a number of factors such as water temperature, salt content, pressure etc. Here it is the water temperature that has the greatest impact for the measuring result.

In order to carry out efficient fishing operations, and to optimise fuel consumption, it is necessary to have a high level of precision for measurements that are used to optimise a trawl operation.

By incorporating temperature measurements either by means of a temperature sensor in at least one sensor module or by using at least one separate temperature sensor, and sending the measured temperature of the water to the hydrophone 30 on the vessel, the calculating unit 40 on the vessel can use the measured temperature in accurate calculation of difference in distance to the sensor modules 10, 20.

In that a temperature sensor is also installed in the vicinity of the hydrophone 30 on the vessel, a temperature profile can be established along the sound propagation path of the acoustic signals, this profile giving correct sound velocity in water which can be used in calculating difference in distance and distance to the sensor modules 10, 20.

For optimal control of a trawl it is of importance to aim for optimal trawl geometry and towing speed throughout the trawl haul, also through changes in course, engine speed, propeller pitch, winches and changes in angles of trawl doors and sinkers. It goes without saying that this is a complex process which requires accurate information.

A change in each of the control parameters alone does not make it possible to obtain optimal trawl geometry. Only a combination of changes in two or more parameters simultaneously, depending on the conditions, makes it possible to obtain optimal trawl geometry, positioning of the trawl and correct towing speed, i.e., the speed of the trawl through the sea.

A complete system for adjusting and positioning a trawl in order to obtain optimal trawl geometry and towing speed throughout a trawl haul may comprise the use of the said sensor modules 10, 20, echo sounder, sonar, trawl sonar, GPS, wind gauge, seabed chart, wave gauge and winch data, and how the measuring data from these is used by the calculating unit 40 to control different parameters such as change in the vessel's course, engine speed, propeller pitch, winches and change in angle of trawl doors and sinkers.

Figure 5:
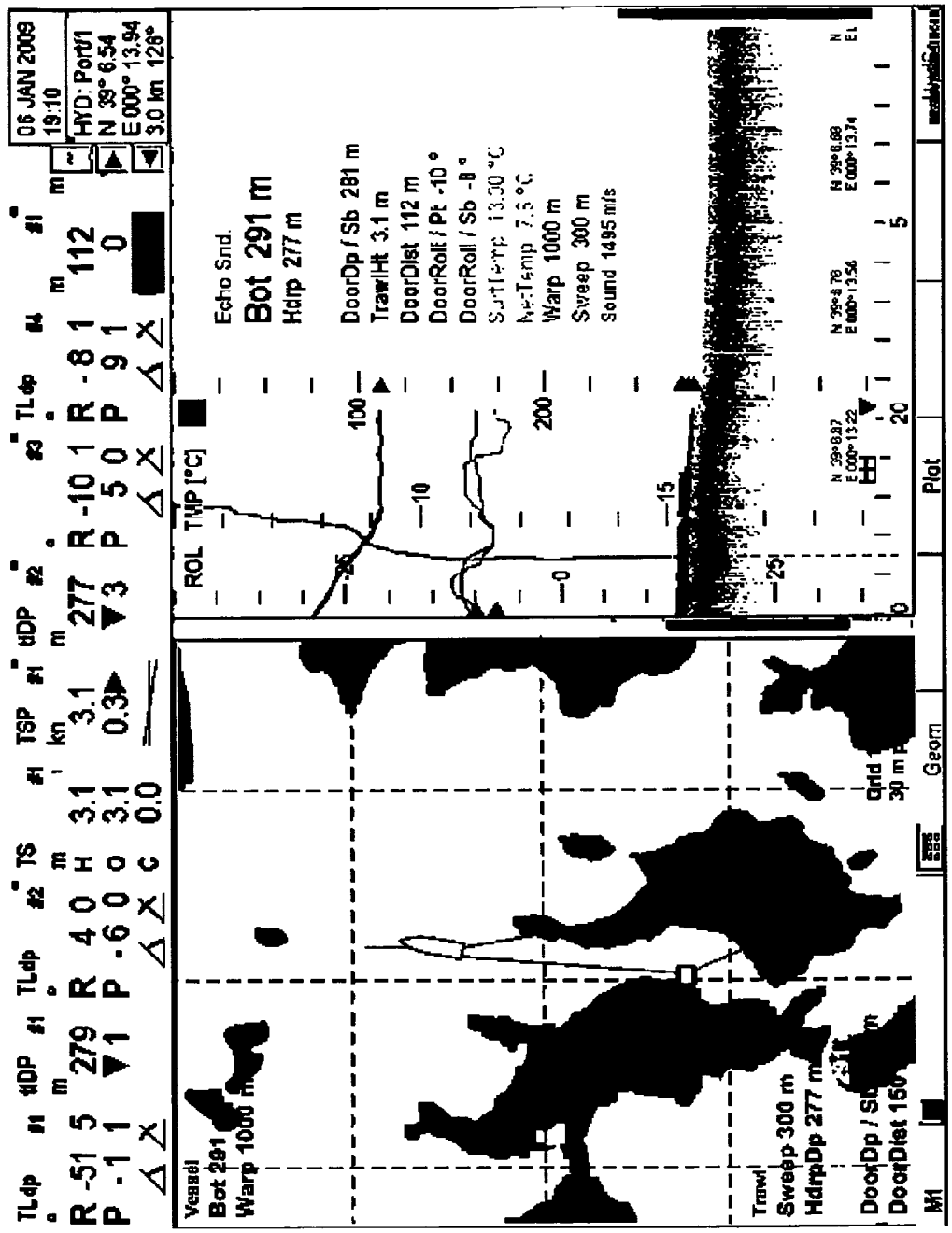
FIG. 5 shows a screen image for a trawl monitoring system.

FIG. 5 shows an example of a screen image for a trawl monitoring for trawling. Such a system will thus be connected to the said calculating unit 40. In the image on the left there is a representation of a trawl 70 and sensor modules 10, 20 in relation to a sea chart system. Due to temperature corrections and the said inventive positioning technology, the position of the trawl and the distance to the vessel will give the fisherman the precise position of his trawl in relation to the vessel.

In addition to providing information about the location of a vessel in relation to a seabed chart, such a screen image may also provide information about several different parameters related to sensor modules 10, 20 mounted on the trawl 70 as shown in the image on the right, where, inter alia, also the depth of the trawl doors is shown.

The inventive method makes it possible to adapt the aforementioned control parameters to each other. As the geometry of the trawl changes with changing seabed conditions, a change in trawl depth, speed and heading of underwater currents, degree of filling etc., correct information about the difference in distance between a set of sensor modules 10, 20 will provide important information for adjustment and positioning of the sensor modules 10, 20.

The invention claimed is:

1. A method for determining distance from a reference point to at least two sensor modules (10, 20) when these have the same distance to the reference point and all of which are located under water, wherein the sensor modules (10, 20) are in signal connection with each other in that they comprise means for sending and receiving acoustic signals, and wherein the reference point comprises a hydrophone (30) with means for receiving acoustic signals from the sensor modules (10, 20), the method comprising the following steps:
   a) sending an acoustic signal from the first sensor module (10) to the second sensor module (20);
   b) sending an acoustic signal from the second sensor module (20) to the first sensor module (10) and the hydrophone (30) either immediately, or following set time delays after the second sensor module (20) receives the said first acoustic signal sent from the first sensor module (10);
   c) measuring in the first sensor module (10) the time $T_1$ it takes from when the acoustic signal is sent from the first sensor module (10) until the first sensor module (10) receives the said acoustic signal sent from the second sensor module (20);
   d) sending an acoustic signal, comprising the said time $T_1$, from the first sensor module (10) to the hydrophone (30) either immediately, or following a set time delay after the first sensor module (10) receives the said acoustic signal sent from the second sensor module (20);
   e) measuring arrival times and travel times of received acoustic signals sent from the first and second sensor module (10, 20) to the hydrophone (30) at the reference point;
   f) determining the difference in distance from the reference point to each of the sensor modules (10, 20) by calculating this difference in a calculating unit (40) connected to the hydrophone (30) at the reference point based on measured arrival times of acoustic signals on the hydrophone (30), and on the time $T_1$ and optional set time delays, characterised in performing the following additional steps:
   g) adjusting and positioning the distance to the sensor modules (10, 20) in relation to the reference point such that calculated difference in distance approaches zero;
   h) logging over time values of received acoustic signals within a set uncertainty for calculated differences for distances approaching zero;
   i) determining distance from the reference point to the at least two sensor modules (10, 20) by using measured travel times of the acoustic signals that are included in said logged values.

2. A method according to claim 1, characterised in that the said uncertainty in step h) is within one standard deviation.

3. A method according to claim 1, characterised in that the adjustment and positioning of the sensor modules (10, 20) is effected in that the sensor modules (10, 20) are towed behind a vessel via a line or wire that is fastened to trawl winches that control them.

4. A method according to claim 1, characterised in that the adjustment and positioning of the sensor modules (10, 20) is effected in that control signals are sent to the sensor modules (10, 20) which travel behind the vessel with the aid of separate remote-controlled propulsion means.

5. A method according to claim 1, characterised in that the reference point is connected to a fixed structure, and where the sensor modules (10, 20) move in relation to the fixed structure, and wherein the method comprises a further step of adjusting and positioning the sensor modules (10, 20) in relation to the fixed structure based on calculated difference in distance.

6. A method according to claim 1, characterised in that it further comprises use of a GPS on the vessel to determine the vessel's position, heading and speed, this information being used in the adjustment and positioning of the sensor modules (10, 20).

7. A method according to claim 1, characterised in that the hydrophone (30) is acoustic means for sending signals to the sensor modules (10, 20) which, upon receipt of these signals, send acoustic signals back to the hydrophone (30) such that distances from sensor modules (10, 20) to the hydrophone (30) can be determined.

8. A method according to claim 1, characterised in that the hydrophone (30) and sensor modules (10, 20) are connected to timing means such that distances from sensor modules (10, 20) to the hydrophone (30) can be determined.

9. A method according to claim 1, characterised in measuring depth, height and angle of at least one of the sensor modules (10, 20), this information being sent to the hydrophone (30) at the reference point to provide further information about the sensor modules (10, 20).

10. A method according to claim 1, wherein at least one sensor module (10, 20) comprises a temperature sensor, and wherein the method is characterised in measuring the temperature of the water and sending this information to the hydrophone (30) at the reference point, and where the calculating unit (40) connected to the hydrophone utilises the measured temperature in the calculation of the difference in distance to the sensor modules (10, 20).

11. A method according to claim 9, characterised in that a temperature profile along the sound propagation path of the acoustic signals is established, this profile being used in the calculation of difference is distance to the sensor modules (10, 20), and where the temperature profile is established by measuring temperatures at at least one point along the path in which the sound will propagate and then transfer current measured temperature or calculated sound velocity from measured temperature of the calculating unit (40) connected the hydrophone at the reference point.

12. A method according to one of the preceding claims, characterised in that the first and second sensor module (10, 20) are attached to their respective trawl door on a trawl, such that the position and the opening of a trawl can be adjusted and positioned to obtain a constant and optimal trawl geometry.

13. A method according to claim 1, characterised in that two or more sensor modules (10, 20) are fastened to a seismic cable at differently spaced locations on the cable in order to be able to determine the distance between a reference point and the sensor modules (10, 20), and the profile that the seismic cable has at any given time.

14. A method according to claim 1, characterised in providing a complete and automatic system for adjustment and positioning of a trawl in order to obtain optimal trawl geometry and towing speed during a trawl haul, by using said sensor modules (10, 20), echo sounder, sonar, trawl sonar, GPS, gyro, wind gauge, wave gauge, winch data, seabed chart, and where the measuring data therefrom is used by the calculating unit (40) to control different parameters in order to alter the course of a vessel, engine speed, propeller pitch, winches and to alter angles of trawl doors and sinkers.

\* \* \* \* \*